US008811932B2

(12) United States Patent
Dehner et al.

(10) Patent No.: US 8,811,932 B2
(45) Date of Patent: *Aug. 19, 2014

(54) METHOD AND SYSTEM FOR WIRELESS COMMUNICATIONS BETWEEN BASE AND MOBILE STATIONS

(71) Applicant: Apple Inc., Cupertino, CA (US)

(72) Inventors: Leo G. Dehner, Austin, TX (US); James W. McCoy, Austin, TX (US); Kevin B. Traylor, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/730,658

(22) Filed: Dec. 28, 2012

(65) Prior Publication Data

US 2013/0122848 A1 May 16, 2013

Related U.S. Application Data

(63) Continuation of application No. 13/190,384, filed on Jul. 25, 2011, now Pat. No. 8,346,205, which is a continuation of application No. 11/688,125, filed on Mar. 19, 2007, now Pat. No. 7,986,933.

(51) Int. Cl.
   *H04B 1/16* (2006.01)
(52) U.S. Cl.
   USPC .................... 455/343.2; 370/329; 455/574

(58) Field of Classification Search
   USPC .................. 370/329; 455/574, 343.2
   See application file for complete search history.

(56) References Cited

U.S. PATENT DOCUMENTS

| | | | |
|---|---|---|---|
| 5,359,595 A * | 10/1994 | Weddle et al. | 370/468 |
| 5,872,775 A | 2/1999 | Saints et al. | |
| 2002/0065071 A1 * | 5/2002 | Hunzinger | 455/421 |
| 2004/0132430 A1 * | 7/2004 | Shino et al. | 455/412.1 |
| 2004/0146020 A1 * | 7/2004 | Kubler et al. | 370/329 |
| 2004/0258014 A1 | 12/2004 | Ro et al. | |
| 2005/0123138 A1 * | 6/2005 | Abe et al. | 380/255 |
| 2006/0023680 A1 * | 2/2006 | Oh et al. | 370/338 |
| 2006/0056357 A1 | 3/2006 | Payne et al. | |
| 2006/0194564 A1 * | 8/2006 | Hokimoto et al. | 455/343.2 |

* cited by examiner

*Primary Examiner* — George Eng
*Assistant Examiner* — Joseph Dean, Jr.
(74) *Attorney, Agent, or Firm* — Paradigm IP Law, PC; Ross L. Franks

(57) ABSTRACT

A method and system for wireless communications between base and mobile stations use reference signals transmitted from base stations prior transmission of data signals. The reference signals are used to determine propagation characteristics of communication channels between the base and mobile stations and optimize, in real time, parameters of receivers of the mobile stations for processing the following data signals. Applications of the invention include wireless communication systems compliant with OFDMA, 3GPP LTE, RFN-OFDMA, OFDM, TDMA, and the like communication protocols.

13 Claims, 4 Drawing Sheets

METHOD AND SYSTEM FOR WIRELESS COMMUNICATIONS BETWEEN BASE AND MOBILE STATIONS

PRIORITY

This application is a continuation of and claims priority to co-owned and U.S. patent application Ser. No. 13/190,384 entitled "METHOD AND SYSTEM FOR WIRELESS COMMUNICATIONS BETWEEN BASE AND MOBILE STATIONS" filed Jul. 25, 2011, (now issuing as U.S. Pat. No. 8,346,205), which is a continuation of and claims priority to U.S. patent application Ser. No. 11/688,125 entitled "METHOD AND SYSTEM FOR WIRELESS COMMUNICATIONS BETWEEN BASE AND MOBILE STATIONS" filed Mar. 19, 2007, (which has issued as U.S. Pat. No. 7,986,933), each of the foregoing incorporated herein by reference in its entirety.

FIELD

The present inventions relates generally to the field of wireless communications, and more specifically, to a method and system for wireless communications between base and mobile stations.

RELATED ART

In wireless communication system using communication protocols based on time division multiplexing techniques (for example, an Orthogonal Frequency Division Multiple Access (OFDMA) communication protocol), a base station transmits information to a mobile station with pre-determined periodicity during pre-assigned time intervals. To reduce power consumption and extend battery life, between such time intervals a receiver of the mobile station is switched to an energy-saving standby state.

However, during periods of time between consecutive transmissions, propagation characteristics of a communication channel between the base and mobile stations may change significantly. As a result, when re-activated, the receiver of the mobile station may not be optimally configured for receiving transmissions from the base station.

Despite the considerable effort in the art devoted to development of methods and systems for communications between base and mobile stations, further improvements would be desirable.

BRIEF DESCRIPTION OF THE DRAWINGS

The present invention is illustrated by way of example and is not limited by the accompanying figures, in which like references indicate similar elements, except that suffixes may be added, when appropriate, to differentiate such elements. It is contemplated that features or steps of one embodiment may beneficially be incorporated in other embodiments without further recitation. Elements in the figures are illustrated for simplicity and clarity and have not necessarily been drawn to scale.

DETAILED DESCRIPTION

Figure 1:
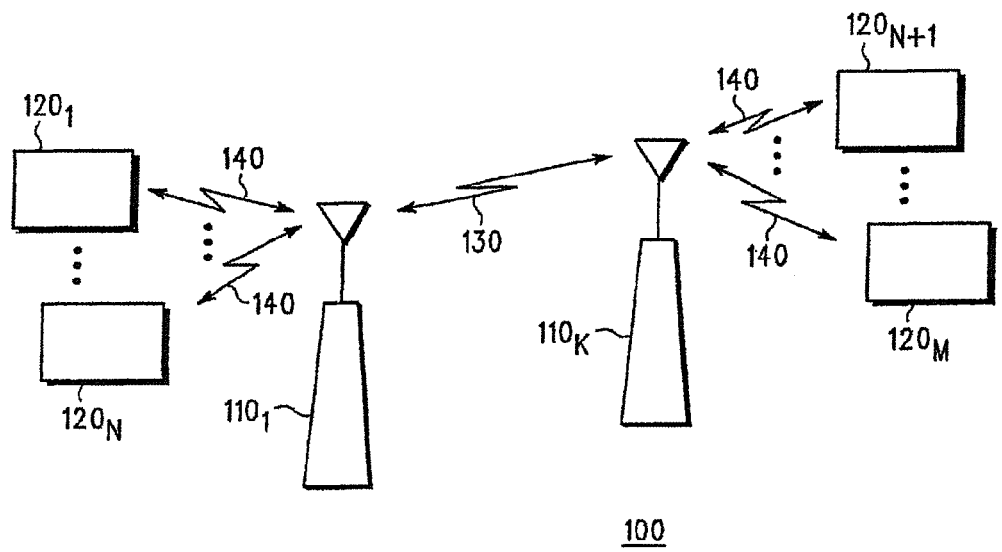
FIG. 1 is a schematic diagram illustrating a portion of a system for wireless communications adapted for implementing an embodiment of the present invention.
Figure 2:
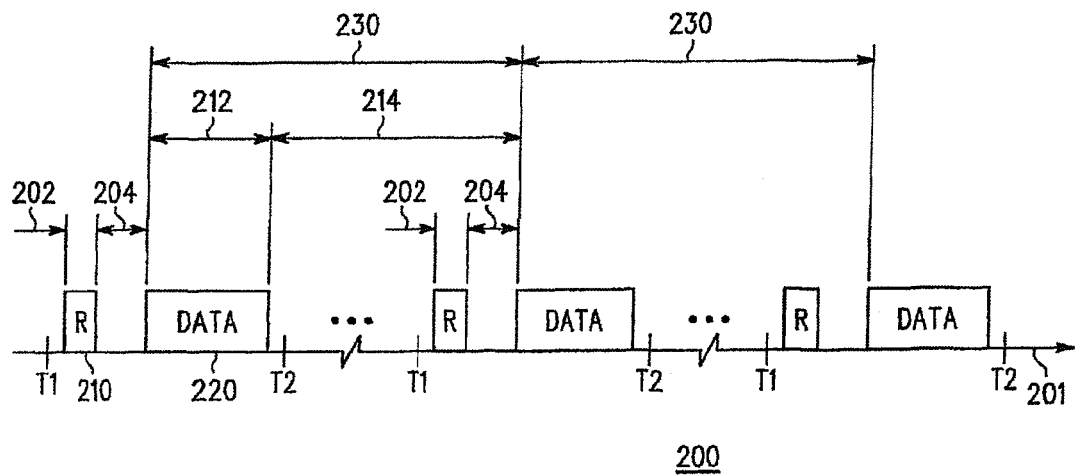
FIG. 2 is a schematic timing diagram of reference and data signals used in the system of FIG. 1.

Referring to the figures, FIG. 1 depicts a schematic diagram illustrating a portion of a wireless communication system 100 adapted for implementing an embodiment of the present invention, and FIG. 2 depicts a schematic timing diagram 200 of reference and data signals used in the system 100 as a function of time (axis 201).

Generally, the system 100 is compliant with a communication protocol such as an Orthogonal Frequency Division Multiple Access (OFDMA) communication protocol, a Third Generation Partnership Project Long Term Evolution (3GPP LTE) communication protocol, a Random Frequency-Hopping OFDMA (RFN-OFDMA) communication protocol, an Orthogonal Frequency-Division Multiplexing (OFDM) communication protocol, or a time division multiple access (TDMA) communication protocol, among other communication protocols.

Illustratively, the system 100 comprises a plurality of base stations 110 and a plurality of mobile stations (or units of user equipment (UE)) 120. The base stations 110 are communicatively selectively coupled to one another via interfaces 130 (for example, wireless (as shown), wired, or optical interfaces), and the mobile stations 120 are selectively coupled to the respective regional base stations 110 via wireless interfaces 140.

In the depicted embodiment, mobile stations $120_1$-$120_N$ and $120_{N+1}$-$120_M$ are coupled to the base stations $110_1$ and $110_K$, respectively, where N, M, and K are integers and M>N. In exemplary applications, a mobile station is wireless communication device such as a cellular phone, a personal digital assistant (PDA), a mobile computer, and the like.

Referring to FIG. 2, in operation, a base station 110 cyclically transmits to a particular mobile station 120, with a pre-determined periodicity 230, a reference signal 210 (denoted as "R") and a data signal 220 (denoted as "DATA") carrying information directed to that mobile station. In one embodiment the data signal 220 constitutes a sub-frame of a downlink in the context of the 3GPP LTE communication protocol.

In one embodiment, the reference signal is determined by (i) a time-frequency pattern of reference symbol locations and (ii) amplitude and phase modulation of a sequence applied to the reference symbol locations. For example, the reference symbol locations may be separated, in the time domain, approximately by integer multiples of $1/14$ milliseconds and, in the frequency domain, by multiples of 15 kHz. Typical sequences used to create the amplitude and phase modulation applied to the reference symbol locations have near-zero cross-correlation and near-zero autocorrelation properties. Examples of such sequences include the Generalized Chirp-like (GCL) sequence, the Constant Amplitude Zero Auto-Correlation (CAZAC) sequence, and the Walsh sequence.

In the time domain, the reference signal 210 precedes the respective data signal 220 (for example, a reference signal $210_L$ precedes a data signal $220_L$, where L is an integer). More specifically, the reference signal 210 and the data signal 220 are transmitted during time intervals 202 and 212, respectively, which are separated by a time interval 204. In operation, after receiving the data signal 220 (illustratively, at a moment T2), a receiver of the mobile station 120 is switched from an active state to a standby state until a moment T1. The moment T1 precedes an arrival of the reference signal 210 of fee consecutive cycle 230 and, at the moment T1, the receiver of the mobile station is switched back to the active state.

In one embodiment, the duration of the reference signal 210 is from about 20 to 200 μsec, the duration of the time interval 204 is from about 0.3 to 3 msec, the duration of the data signal 220 is from about 0.5 to 5 msec, and the duration of the time interval 230 is from about 0.5 to 5 sec.

In operation, during a time interval 214 separating consecutive transmissions of the data signals 220, propagation characteristics of a communication channel between the base and mobile stations may change substantially enough to have detrimental effect of qualitative parameters of the system 100. The reference signal 210 is generally a test signal having pre-determined characteristics that is transmitted to the mobile station(s) for determining instant propagation characteristics of the communication channel. Using results of analysis of reception of the reference signal 210, the mobile station adjusts, in real time, configuration parameters of its receiver to optimize reception of the data signal 220 shortly following the reference signal 210 upon expiration of the time interval 204.

Figure 3:
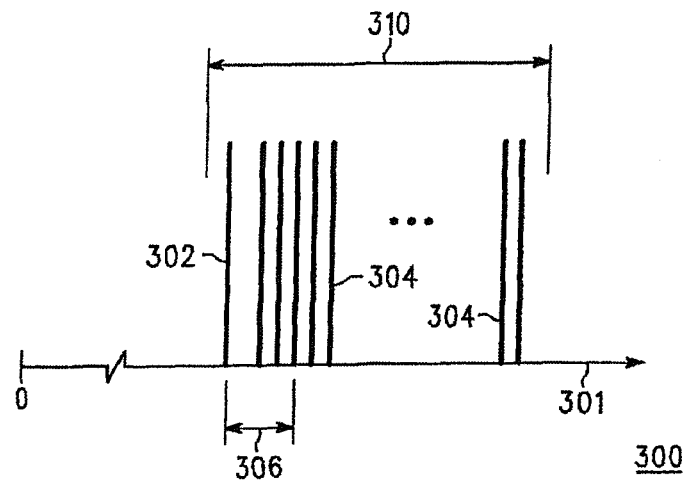
FIG. 3 is a schematic diagram illustrating an exemplary allocation of frequencies of the reference and data signals of FIG. 2 in the frequency domain.

FIG. 3 depicts a schematic diagram 300 illustrating an exemplary allocation of frequencies of the reference and data signals of FIG. 2 in the frequency domain (x-axis 301). In the depicted embodiment, the reference signal 210 is illustratively transmitted at a sub-carrier frequency 302, and the data signals 220 directed to respective mobile stations 120 are selectively transmitted at sub-carrier frequencies 304. The frequencies 302 and 304 generally are sub-carrier frequencies of the system 100 and disposed within bandwidths 310 of receivers of the mobile stations 120.

In the depicted embodiment, the reference signal 210 is transmitted at a sub-carrier frequency disposed at a boundary of a bandwidth 310 and allocated at a spectral distance 306 from a particular sub-carrier frequency 304. In alternate embodiments, any sub-carrier frequency 304 may by used for transmitting the reference signal 210, as well as the same sub-carrier frequency may used for transmitting both the reference and data signals. Typically, carrier frequencies of the reference and data signals 210, 220 are in a range from 400 MHz to 2.6 GHz, sub-carrier frequencies 302, 304 are on a 15 kHz raster over 1.25 MHz to 20 MHz bandwidths offset by a respective carrier frequency, and the spectral distance 306 is an integer multiple of 15 kHz.

In further embodiments, in consecutive cycles 230, the reference and data signals 210 and 220 may be transmitted at different sub-carrier frequencies (for example, frequencies changed in pre-selected pattern). Additionally or alternatively, in the time domain, at least portions of the reference and data signals may also be transmitted using different or multiple sub-carrier frequencies. As such, in various embodiments, in the time/frequency continuum, the base station 110 may generate a plurality of the reference signals 210 having the same or different frequencies, where each reference signal precedes the respective data signal 220, which is directed to a particular mobile station 120 and transmitted at a single or multiple sub-carrier frequencies.

Figure 4:
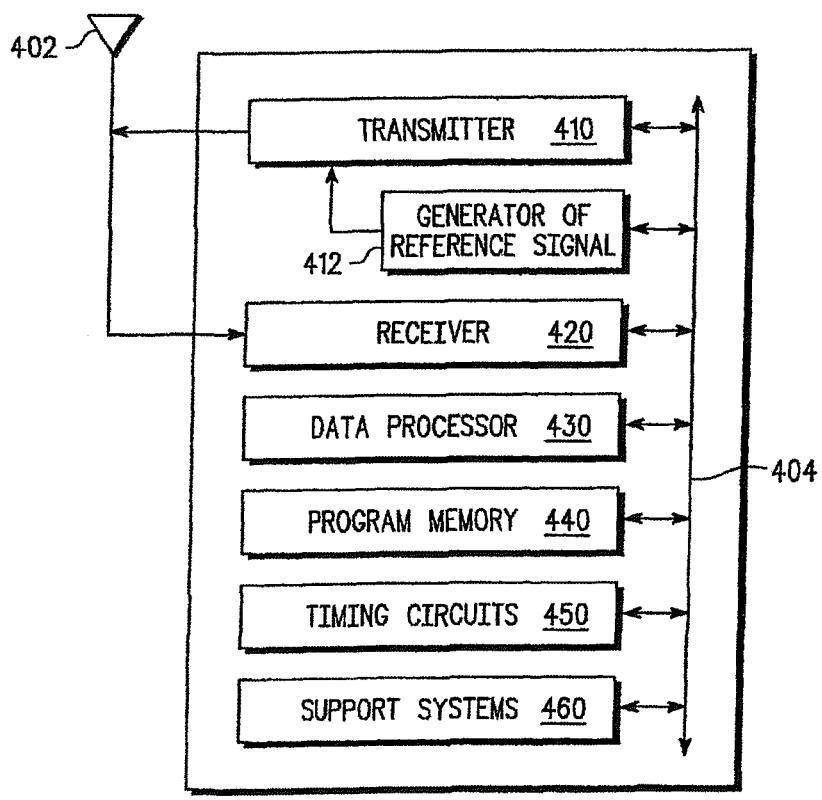
FIG. 4 is a schematic diagram of an exemplary base station of the system of FIG. 1 in accordance with one embodiment of the present invention.

FIG. 4 depicts a schematic diagram of an exemplary base station 110 of the system 100 of FIG. 1 in accordance with one embodiment of the present invention. The base station 110 generally comprises an antenna 402, a transmitter 410, a generator 412 of the reference signal 210, a receiver 420, a data processor 430, a program memory 440, timing circuits 450, support systems 460, and interfaces (illustratively, shown as a common bus 404) supporting data/command exchanges between components of the base station.

Programs of a respective communication protocol implemented in the system 100 are stored in the program memory 440 and, when executed by the data processor 430, facilitate operability of the base station 110. In particular, the transmitter 410 and receiver 420 support bi-directional wireless communications between the base station 110 and adjacent base station(s) of the system 100 and between the base station 110 and a plurality of the mobile stations 120. In operation, the timing circuits 450 generate synchronization signals, which facilitate allocation of pre-determined time slots for uplink and downlink transmissions to each of the mobile stations 120. Input/output devices, power sources, and the like auxiliary components of the base station 110 are collectively denoted herein as support systems 460.

In the depicted embodiment, the generator 412 is shown as a stand-alone device coupled to the transmitter 410, however, in an alternate embodiment, the generator 412 may be a portion of the transmitter 410. Alternatively or additionally, at least portions of the generator 412 may be implemented in software as a computer program stored in the program memory 440 and, in operation, executed by the data processor 430. In yet another embodiment, the generator 412 may directly be coupled to the antenna 402.

Figure 5:
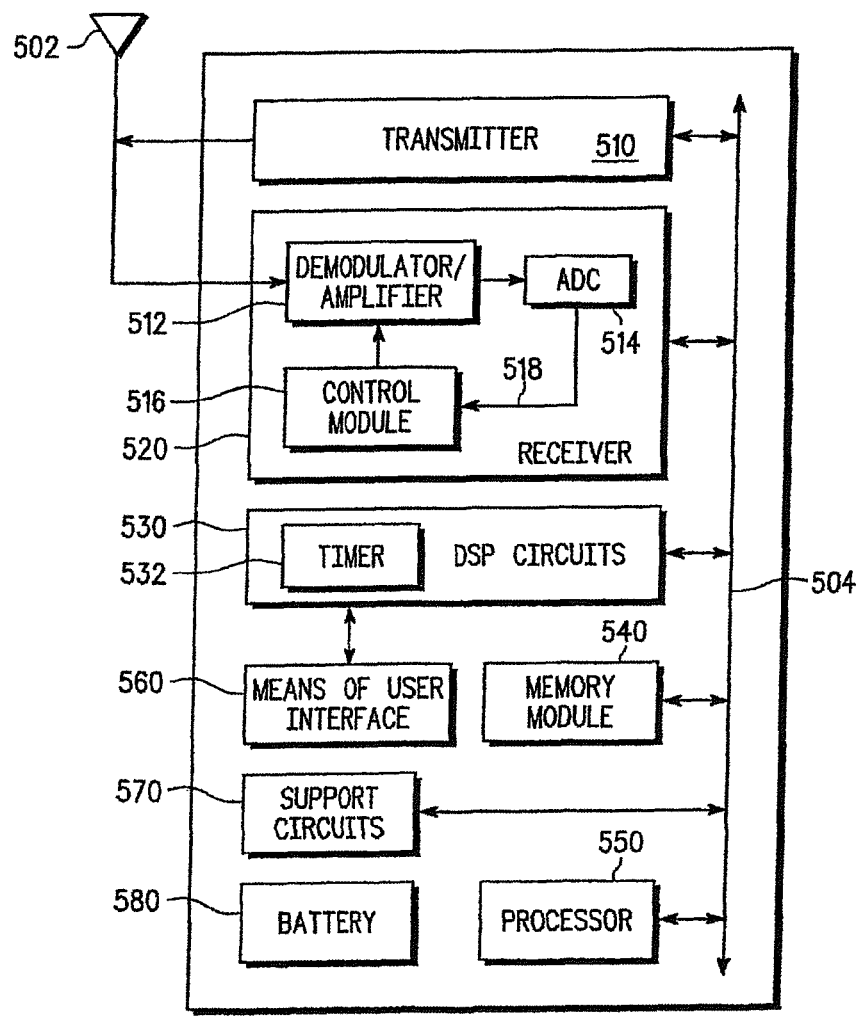
FIG. 5 is a schematic diagram of an exemplary mobile station of the system of FIG. 1 in accordance with one embodiment of the present invention.

FIG. 5 is a schematic diagram of an exemplary mobile station 120 of the system 100 of FIG. 1 in accordance with one embodiment of the present invention. The mobile station 120 generally comprises an antenna 502, a transmitter 510, a receiver 520, digital signal processing (DSP) circuits 530, a memory module 540, a processor 550, user interface 560, auxiliary devices collectively denoted herein as support circuits 570, a battery 580 powering components of the mobile station, and interfaces (illustratively, shown as a common bus 504) supporting data/command exchanges between components of the mobile station.

In operation, the processor 550 administers operation of the mobile station 120 by executing programs stored in the memory module 540 and following user instructions entered via the user interface 560. The user interface 560 may include at least some of a speaker, a microphone, a display, a keyboard, wired or optical connectors, pushbuttons, or indicators, among other devices adapted to facilitate human or machine interactions with a computerized communication device such as mobile station 120.

The DSP circuits 530 generally provide synchronization between the transmitter 510 and receiver 520 and the base station 110, as well as facilitate support for the user interface 560. Illustratively, the DSP circuits 530 includes a timer 532 providing, in particular, synchronization between timing of transitions to active/standby states of the transmitter 510 and the reference and data signals 210 and 220 of the base station 110, as discussed above in reference to FIG. 2. In alternate embodiments, at least a portion of functions of the DSP circuits 530 may be implemented in software as a computer program stored in the memory module 540 and, in operation, executed by the processor 550.

Via the antenna 502, the transmitter 510 and receiver 520 support bi-directional communications between the mobile station 120 and the respective base station 110. In one embodiment, the receiver 520 includes a demodulator/amplifier 512, an analog-to-digital converter (ADC) 514, and a control module 516. In operation, the receiver 520 receives and processes downlink transmissions from the base station 110, each such transmission comprising the reference and data signals 210 and 220, as discussed above in reference to FIGS. 2-3.

After receiving the reference signal 210, the control module 516 analyses a corresponding feedback signal forwarded to the module 516 via interface 518. Based on results of the analysis, the control module 516 determines propagation characteristics of a communication channel between the base and mobile stations and adjusts, in real time, configuration parameters of the demodulator/amplifier 512 to provide optimal conditions for receiving the data signal 220. In one embodiment, the control module 516 adjusts at least one of a gain, a bandwidth, or an in-phase/quadrature compensation of the demodulator/amplifier 512, among other configuration parameters of the receiver 520.

In the depicted embodiment, the control module 516 is a stand-alone hardware portion of the receiver 520, whereas the feedback signal is provided to the module 516, in a digital format, from the ADC 514. In an alternate embodiment, the demodulator/amplifier 512 may be a source of the feedback signal provided in an analog format. In further embodiments, some or all portions of the control module 516 may be implemented in software as a computer program stored in the memory module 540 and, in operation, executed by the processor 550.

Figure 6:
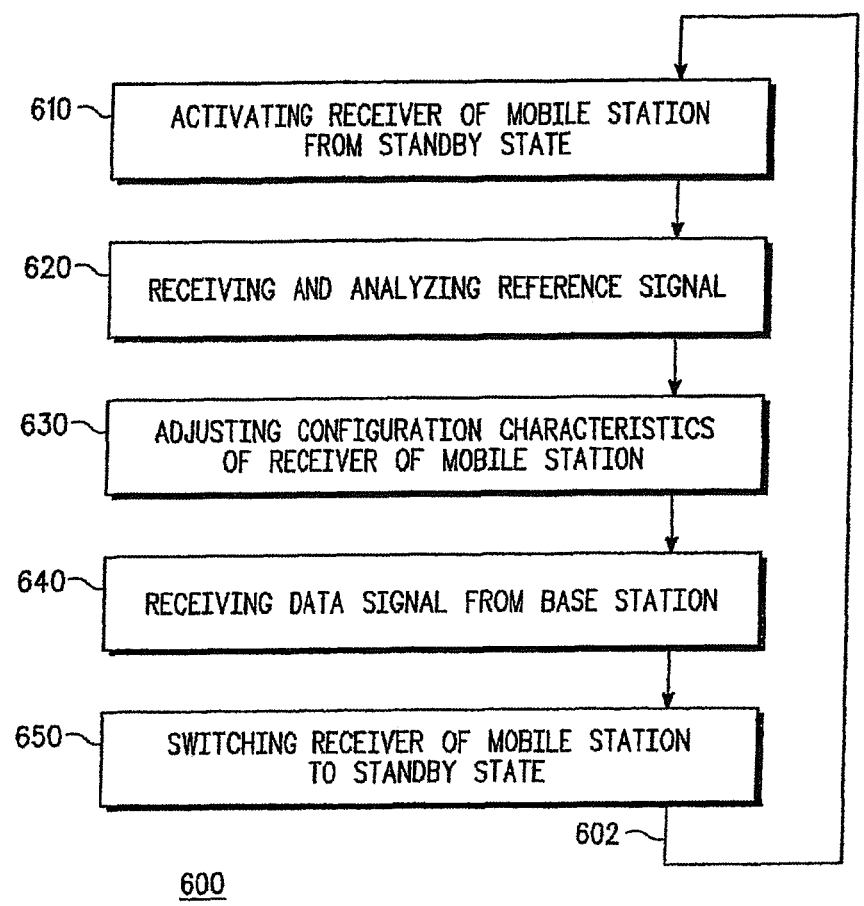
FIG. 6 is a flow diagram illustrating a method for transmitting information in the system of FIG. 1 in accordance with one embodiment of the present invention.

FIG. 6 depicts a flow diagram illustrating a method 600 for transmitting information in the system 100 of FIG. 1 in accordance with one embodiment of the present invention. In exemplary applications, the method 600 is used to enhance performance and, in particular, Quality of Service (QoS) characteristics of the system 100, as well as reduce power consumption in the mobile stations 120.

For brevity, the method 600 is discussed herein in the context of a single base station 110 and a single mobile station 120. Those skilled in the art will readily appreciate that the same method steps are performed, during cyclically repeated time intervals each defined by the respective adjacent moments T1 (discussed in reference to FIG. 2), for each mobile station 120 in communication with a particular base station 110.

The method 600 starts at step 610, where, at the moment T1 preceding an arrival of the reference signal 210, the receiver 520 of the mobile station 120 is switched from a standby state to an active state. In one embodiment, the receiver 520 is initially assigned the configuration parameters used in a preceding active state, i.e., prior to switching the receiver to the standby state. Switching the receiver 520 to the active state may be triggered, for example, by a signal generated using the timer 532 synchronized with the timing circuits 450 of the base station 120.

At step 620, the base station 110 transmits and the mobile station 120 receives the reference signal 210. An amplitude of the transmitted reference signal 220 is pre-selected to provide, within operating range of the base station 110, a high signal-to-noise ratio (SNR) of an output signal of the demodulator/amplifier 512 of the receiver 520 and, correspondingly, a high SNR of an output signal of the ADC 514. The reference signal 210 is transmitted at one of sub-carrier frequencies used in the system 100 and, in different transmissions, may be transmitted at different sub-carrier frequencies.

Using a feedback signal produced by the demodulator/amplifier 512 or the ADC 514, the received reference signal 210 is analyzed using the control module 516 of the receiver 520. An algorithm used by the control module 516 to analyze the reference signal 210 may be implemented in a form of hardware, software, or a combination thereof in the module 516 or at least portions of the algorithm may be implemented in a form of a computer program stored in the memory module 540 of the receiver 520. In one embodiment, the algorithm is directed to determining parameters of the Rayleigh fading of the reference signal 210 in the communication channel between the base and mobile stations.

At step 630, using results of the analysis of the reference signal 210, the configuration characteristics (e.g., gain, bandwidth, in-phase/quadrature compensation, among other parameters) of the receiver 520 are adjusted to provide optimal conditions (e.g., maximum SNR) during reception of the data signal 220. The receiver 520 having the adjusted configuration characteristics may use the ADC 514 having reduced dynamic range and, consequently, low power consumption. In one embodiment, the analysis of the reference signal 210 is completed and the configuration characteristics are adjusted prior to expiration of the time interval 204.

In one embodiment, when propagation characteristics of the communication channel between the base and mobile stations momentarily deteriorate to a point mat the reference signal is missed in the channel, the control module 516 restores/maintains the configuration parameters defined during at least one of most recent transmissions.

At step 640, the base station 110 transmits and the mobile station 120 receives the data signal (i.e., sub-frame) 220. The data signal 220 is transmitted at one of the sub-carrier frequencies 404 that may either be equal to or different from the sub-carrier frequency of the reference signal 210, as well as may hop during the transmission (i.e., during time interval 212) or differ from one transmission to another. Using the receiver 520 having its configuration characteristics adjusted as discussed above in reference to steps 620 and 630, the mobile station 120 provides, at minimal power consumption, reception of the data signal 220 with a peak SNR.

At step 640, after receiving the data signal 220, at the moment T2, the receiver 520 is switched from the active state to the energy-saving standby state. A transition to the standby state may be initiated using, for example, a signal produced by the timer 532. To preserve resources of the battery 580, the receiver 520 is maintained in the standby state until the moment T1 of the next transmission cycle 230, where the steps of method 600 are repeated, as shown with a link 602.

In a further embodiment, the system 100 may be a Multiple-Input Multiple-Output (MIMO) wireless communication system using multiple antennas at the base and mobile stations and employing at least one of beamforming, spatial multiplexing, or diversity coding techniques.

In one example of a MIMO system, the antenna 402 of the base station 110 would represent a composite antenna having multiple, spacially separated antenna structures. Each antenna structure is selectively adapted for transmitting same or different signals at pre-selected pluralities of sub-carrier frequencies. Correspondingly, in said MIMO embodiment, the antenna 502 of the mobile station 120 may also be a composite antenna having multiple antenna units each selectively adapted for receiving particular portions of signals transmitted by the base station 110. In this embodiment, the receiver 520 would be a multi-section unit, where each section includes the demodulator/amplifier 512, ADC 514, and a control module 516. Inputs and outputs of these sections are selectively coupled to particular antennas units of the composite antenna 502 and to the common bus 504, respectively.

In operation, in such a MIMO system a plurality of communication channels is established, at multiple sub-carrier frequencies, between the antenna structures of the base and the antenna units of the mobile stations, and the reference and data signals 210 and 220 are transmitted through these channels or pre-determined portions thereof. Using the reference signal 210, configuration parameters of each section of the multi-section receiver 520 are adjusted, prior to arrival of the data signal 220, as discussed above in reference to FIG. 6.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

Unless stated otherwise, terms such as "first" and "second" are used to arbitrarily distinguish between the elements such terms describe. Thus, these terms are not necessarily intended to indicate temporal or other prioritization of such elements. Also the invention is described herein with reference to specific embodiments, various modifications and changes can be made without departing from the scope of the present invention. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

What is claimed is:

1. A method for receiving one or more reference signals and one or more data signals, the method comprising:
    switching into an active state before the arrival of a first reference signal;
    receiving the first reference signal;
    determining at least one propagation characteristic of a communication channel based at least in part on the received first reference signal; and
    optimizing reception of a first data signal corresponding to the first reference signal by adjusting at least one receiver parameter based on the at least one propagation characteristic of the communication channel, wherein:
    each reference signal immediately precedes a corresponding data signal, and
    the one or more reference signals have a predetermined periodicity.

2. The method of claim 1, further comprising, subsequent to reception of the first data signal, switching into a standby state.

3. The method of claim 2, further comprising switching into an active state before the arrival of each one of the one or more reference signals based on a the predetermined periodicity.

4. The method of claim 1, where the one or more reference signals comprise Constant Amplitude Zero Auto-Correlation (CAZAC) sequences.

5. The method of claim 1, where the communication channel comprises an Orthogonal Frequency Division Multiple Access (OFDMA) channel.

6. The method of claim 1, where the reference signal is determined by (i) a time-frequency pattern of reference symbol locations, and (ii) an amplitude and phase modulation of a sequence applied to the reference symbol locations.

7. The method of claim 1, the at least one receiver parameter is selected from the group consisting of: (i) a gain parameter, (ii) a bandwidth parameter, and (iii) an in-phase/quadrature compensation parameter.

8. A wireless device configured to receive one or more reference signals and one or more data signals, the device comprising:
    a wireless receiver;
    a processor; and
    a non-transitory computer readable medium in data communication with the processor and comprising one or more instructions configured to, when executed by the processor, cause the wireless device to:
    for each reference signal:
        switch into an active state before the arrival of the a first reference signal;
        receive the first reference signal;
        determine at least one propagation characteristic of a communication channel based at least in part on the received first reference signal; and
        optimize reception of a first data signal corresponding to the first reference signal by adjusting at least one receiver parameter based on the at least one propagation characteristic of the communication channel, wherein:
        each reference signal immediately precedes a corresponding data signal, and
        the one or more reference signals have a predetermined periodicity.

9. The wireless device of claim 8, where the one or more instructions are further configured to, when executed by the processor, cause the device to transition to an energy-saving standby mode after reception of the one or more corresponding data signals.

10. The wireless device of claim 8, where the wireless receiver comprises an Orthogonal Frequency Division Multiple Access (OFDMA) receiver.

11. The wireless device of claim 10, where each reference signal and the corresponding data signal are on different subcarrier frequencies.

12. The wireless device of claim 10, where the one or more reference signals have different subcarrier frequencies.

13. The wireless device of claim 10, where the at least one receiver parameter includes at least one of a gain, a bandwidth, and/or an in-phase/quadrature compensation.

* * * * *